(12) United States Patent
Hasegawa

(10) Patent No.: US 8,634,590 B2
(45) Date of Patent: Jan. 21, 2014

(54) IMAGE PROCESSING DEVICE AND STORAGE MEDIUM STORING IMAGE PROCESSING PROGRAM

(75) Inventor: Tomohiko Hasegawa, Okazaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 503 days.

(21) Appl. No.: 12/973,573

(22) Filed: Dec. 20, 2010

(65) Prior Publication Data

US 2011/0170741 A1 Jul. 14, 2011

(30) Foreign Application Priority Data

Jan. 12, 2010 (JP) ................................ 2010-004211

(51) Int. Cl.
*G06K 9/00* (2006.01)

(52) U.S. Cl.
USPC .......................................... 382/103; 382/107

(58) Field of Classification Search
USPC ......... 382/100, 103, 106–107, 165, 181, 212, 382/260, 278; 348/135.31, 152–153, 699, 348/220.1, 222.1, 169, 143; 358/1.1, 3.14, 358/1.15
See application file for complete search history.

(56) References Cited

U.S. PATENT DOCUMENTS 5,111,410 A * 5/1992 Nakayama et al. ............ 434/258
7,227,893 B1 * 6/2007 Srinivasa et al. ......... 375/240.08

(Continued)

FOREIGN PATENT DOCUMENTS

JP H09-261570 A 10/1997
JP H09-312818 A 12/1997

(Continued)

OTHER PUBLICATIONS

English Machine Translation for Japanese Patent Application No. 2004-254065 on Sep. 9, 2004 (see IDS Jan. 5, 2012 Cite No. 1 Foreign Patent Document).*

(Continued)

*Primary Examiner* — Hadi Akhavannik
*Assistant Examiner* — Mehdi Rashidian
(74) *Attorney, Agent, or Firm* — Baker Botts L.L.P.

(57) ABSTRACT

There is provided an image processing device that includes a processor configured to execute instructions that cause the processor to provide functional units including: a setting unit that sets a plurality of extraction target ranges in a motion image configured of a plurality of frame images that are chronologically in succession with one another, each extraction target range being configured of a group of frame images that are selected from among the plurality of frame images constituting the motion image and that are chronologically in succession with one another, and the plurality of extraction target ranges being set such that there is no common frame image shared among the extraction target ranges; a selecting unit that selects a representative frame image from among the group of frame images in an extraction target range, the representative frame image being such a frame image whose difference from another representative frame image is the largest among differences of the frame images belonging to the extraction target range from the another representative frame image, the another representative frame image being selected from one of the extraction target ranges that is positioned chronologically adjacent to the extraction target range from which the representative frame image is selected; and a layout image generating unit that generates a layout image in which the selected representative frame images are laid out in such a pattern that indicates a chronological relationship among the representative frame images.

12 Claims, 10 Drawing Sheets

(56) References Cited

U.S. PATENT DOCUMENTS

| | | | |
|---|---|---|---|
| 7,940,963 B2* | 5/2011 | Noguchi et al. | 382/107 |
| 8,014,624 B2* | 9/2011 | Olschewski | 382/260 |
| 8,159,545 B2* | 4/2012 | Washisu et al. | 348/208.99 |
| 8,218,025 B2* | 7/2012 | Yonaha | 348/222.1 |
| 8,363,900 B2* | 1/2013 | Huang | 382/107 |
| 2008/0159597 A1* | 7/2008 | Noguchi et al. | 382/107 |
| 2008/0198247 A1* | 8/2008 | Yonaha | 348/254 |
| 2009/0051819 A1* | 2/2009 | Hasegawa | 348/699 |
| 2009/0231453 A1* | 9/2009 | Huang | 348/220.1 |
| 2010/0013937 A1* | 1/2010 | Washisu et al. | 348/208.2 |
| 2010/0033579 A1* | 2/2010 | Yokohata et al. | 348/169 |
| 2011/0228320 A1* | 9/2011 | Hasegawa | 358/1.15 |

FOREIGN PATENT DOCUMENTS

| | | | |
|---|---|---|---|
| JP | 2001-078127 A | 3/2001 | |
| JP | 2004-247899 A | 9/2004 | |
| JP | 2004-254065 A | 9/2004 | |
| JP | 2007-006129 A | 1/2007 | |

OTHER PUBLICATIONS

English Machine Translation for Japanese Patentapplication No. 2007-006129 on Jan. 11, 2007 (see IDS Jan. 5, 2012 Cite No. 2 Foreign Patent Document block).*

English Machine Translation for Japanese Patent Application No. 2004-247899 on Sep. 2, 2004 (see IDS Jan. 5, 2012 Cite (see IDS Jan. 5, 2012 Cite No. 3 Foreign Patent Document block).*

Japan Patent Office, Office Action for Japanese Patent Application No. 2010-004211 (counterpart to above-captioned patent application), mailed Oct. 18, 2011.

Japan Patent Office, Decision of Rejection for Japanese Patent Application No. 2010-004211 (counterpart to above-captioned patent application), mailed Jan. 10, 2012.

The State Intellectual Property Office of the People'S Republic of China, Notification of First Office Action for Chinese Patent Application No. 201110008090.5 (counterpart Chinese patent application), issued Mar. 22, 2013.

* cited by examiner

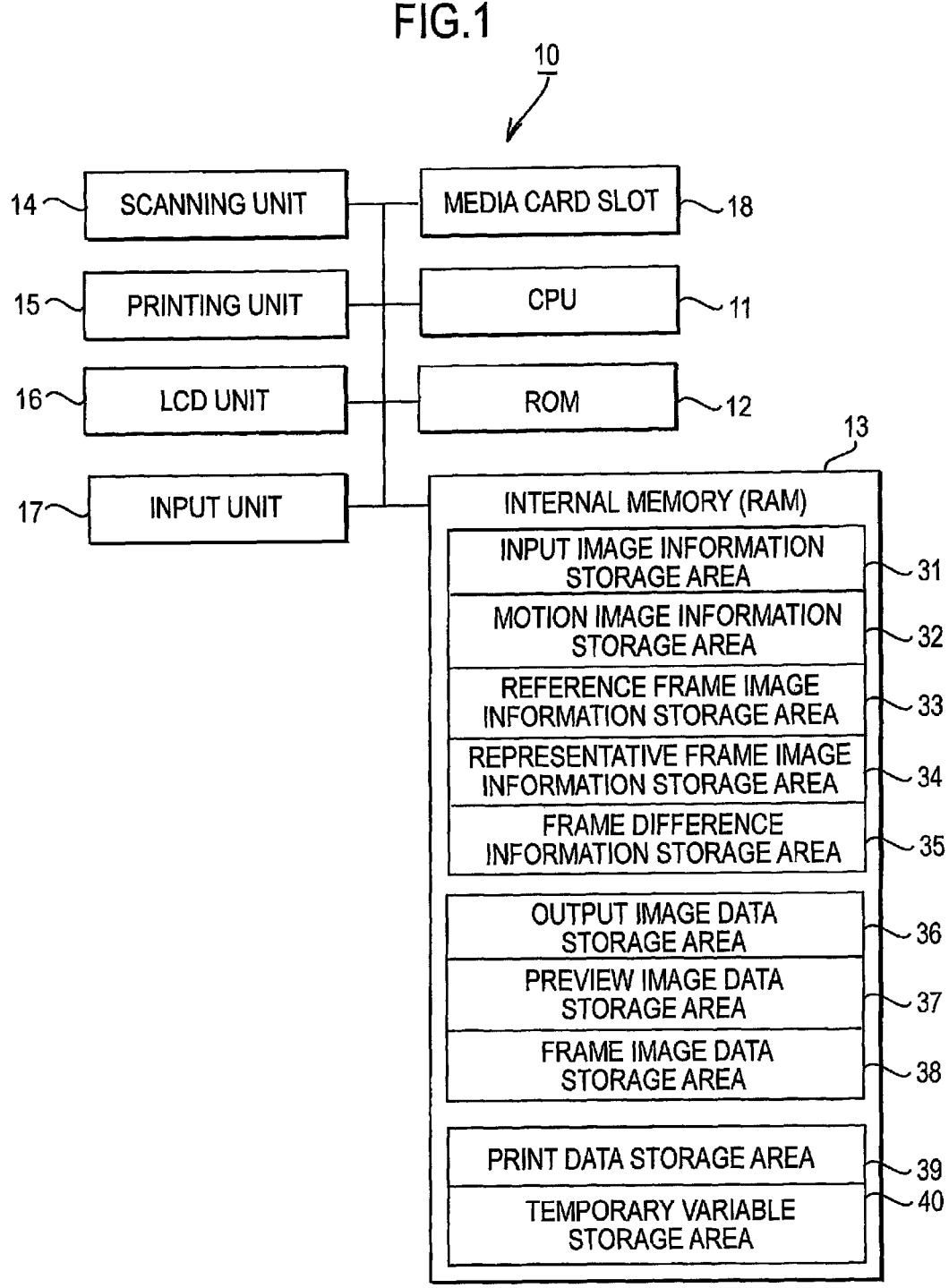

FIG.3A

| 51 | 52 | 53 |
|---|---|---|
| 0 | "IMG01.jpg" | 2885 |
| 1 | "IMG02.avi" | 18000 |
| 2 | "IMG03.mov" | 58763 |
| 3 | "IMG04.jpg" | 4381 |

| | |
|---|---|
| 0 | ~61 |
| 1 | ~62 |
| 640 | ~63 |
| 480 | ~64 |
| 1060 | ~65 |

FIG.4A

| 71 | 72 | 73 | 74 |
|---|---|---|---|
| 0 | 0 | 0 | 15 |
| 1 | 132 | 117 | 147 |
| 2 | 265 | 250 | 280 |
| 3 | 397 | 382 | 412 |
| 4 | 530 | 515 | 545 |
| 5 | 662 | 647 | 677 |
| 6 | 795 | 780 | 810 |
| 7 | 927 | 912 | 942 |
| 8 | 1060 | 1045 | 1060 |

| 81 | 82 |
|---|---|
| 0 | 0 |
| 1 | 130 |
| 2 | 270 |
| 3 | 391 |
| 4 | 538 |
| 5 | 660 |
| 6 | 803 |
| 7 | 918 |
| 8 | 1050 |

34

IMAGE PROCESSING DEVICE AND STORAGE MEDIUM STORING IMAGE PROCESSING PROGRAM

CROSS REFERENCE TO RELATED APPLICATION

This application claims priority from Japanese Patent Application No. 2010-004211 filed Jan. 12, 2010. The entire content of the priority application is incorporated herein by reference.

TECHNICAL FIELD

The present invention relates to an image processing device for generating an image in which a plurality of frame images extracted from a motion image file are laid out.

BACKGROUND

Conventionally, there have been proposals for printing devices capable of printing out images representing motion images configured of a plurality of frame images. For example, a printing device extracts a prescribed number of frame images from a motion image, lays out the extracted frame images in an arrangement on a single page, and prints out the laid-out frame images. More specifically, the printing device extracts frame images from the motion image file at every such an interval that is determined by dividing a total number of frame images constituting the motion image by the number of frame images to be laid out on the single page. With this configuration, the frame images are extracted chronologically at an equi-interval so that a user can easily grasp a flow of the motion image.

SUMMARY

In the above conventional printing device, some of the frame images extracted from the motion image may possibly be similar to one another. In some cases, however, laying out similar frame images is neither favorable nor effective. For example, suppose that a motion image contains a short scene of a particular event. Depending on switchover of scenes, the frame images constituting the short scene may not be extracted at all from the motion image and may not be laid out for printing. If this is the case, the user finds difficulty in recognizing what the motion image is about.

In view of the foregoing; it is an object of the present invention to provide an image processing device capable of generating an image that enables a user to easily recognize a flow and a substance of a motion image. The present invention also provides a storage medium storing an image processing program that facilitates user's understanding on the flow and content of the motion image.

In order to attain the above and other objects, there is provided an image processing device that includes a processor configured to execute instructions that cause the processor to provide functional units including: a setting unit, a selecting unit and a layout image generating unit. The setting unit sets a plurality of extraction target ranges in a motion image configured of a plurality of frame images that are chronologically in succession with one another, each extraction target range being configured of a group of frame images that are selected from among the plurality of frame images constituting the motion image and that are chronologically in succession with one another, and the plurality of extraction target ranges being set such that there is no common frame image shared among the extraction target ranges. The selecting unit selects a representative frame image from among the group of frame images in an extraction target range, the representative frame image being such a frame image whose difference from another representative frame image is the largest among differences of the frame images belonging to the extraction target range from the another representative frame image, the another representative frame image being selected from one of the extraction target ranges that is positioned chronologically adjacent to the extraction target range from which the representative frame image is selected. The layout image generating unit generates a layout image in which the selected representative frame images are laid out in such a pattern that indicates a chronological relationship among the representative frame images.

According to another aspect, the present invention provides a non-transitory computer-readable storage medium that stores a set of program instructions installed on and executed by an image processing device. The set of program instructions includes: setting a plurality of extraction target ranges in a motion image configured of a plurality of frame images that are chronologically in succession with one another, each extraction target range being configured of a group of frame images that are selected from among the plurality of frame images constituting the motion image and that are chronologically in succession with one another, and the plurality of extraction target ranges being set such that there is no common frame image shared among the extraction target ranges; selecting a representative frame image from among the group of frame images in an extraction target range, the representative frame image being such a frame image whose difference from another representative frame image is the largest among differences of the frame images belonging to the extraction target range from the another representative frame image, the another representative frame image being selected from one of the extraction target ranges that is positioned chronologically adjacent to the extraction target range from which the representative frame image is selected; and generating a layout image in which the selected representative frame images are laid out in such a pattern that indicates a chronological relationship among the representative frame images.

BRIEF DESCRIPTION OF THE DRAWINGS

In the drawings:

FIG. 1 is a block diagram illustrating an electrical configuration of a multifunction device including a CPU and an internal memory (RAM);

FIG. 3A is a view conceptually illustrating an input image information storage area of the RAM;

FIG. 3B is a view conceptually illustrating a motion image information storage area of the RAM;

FIG. 4A is a view conceptually illustrating a reference frame image information storage area of the RAM;

FIG. 4B is a view conceptually illustrating an extracted frame image information storage area of the RAM;

DETAILED DESCRIPTION

Figure 2A:
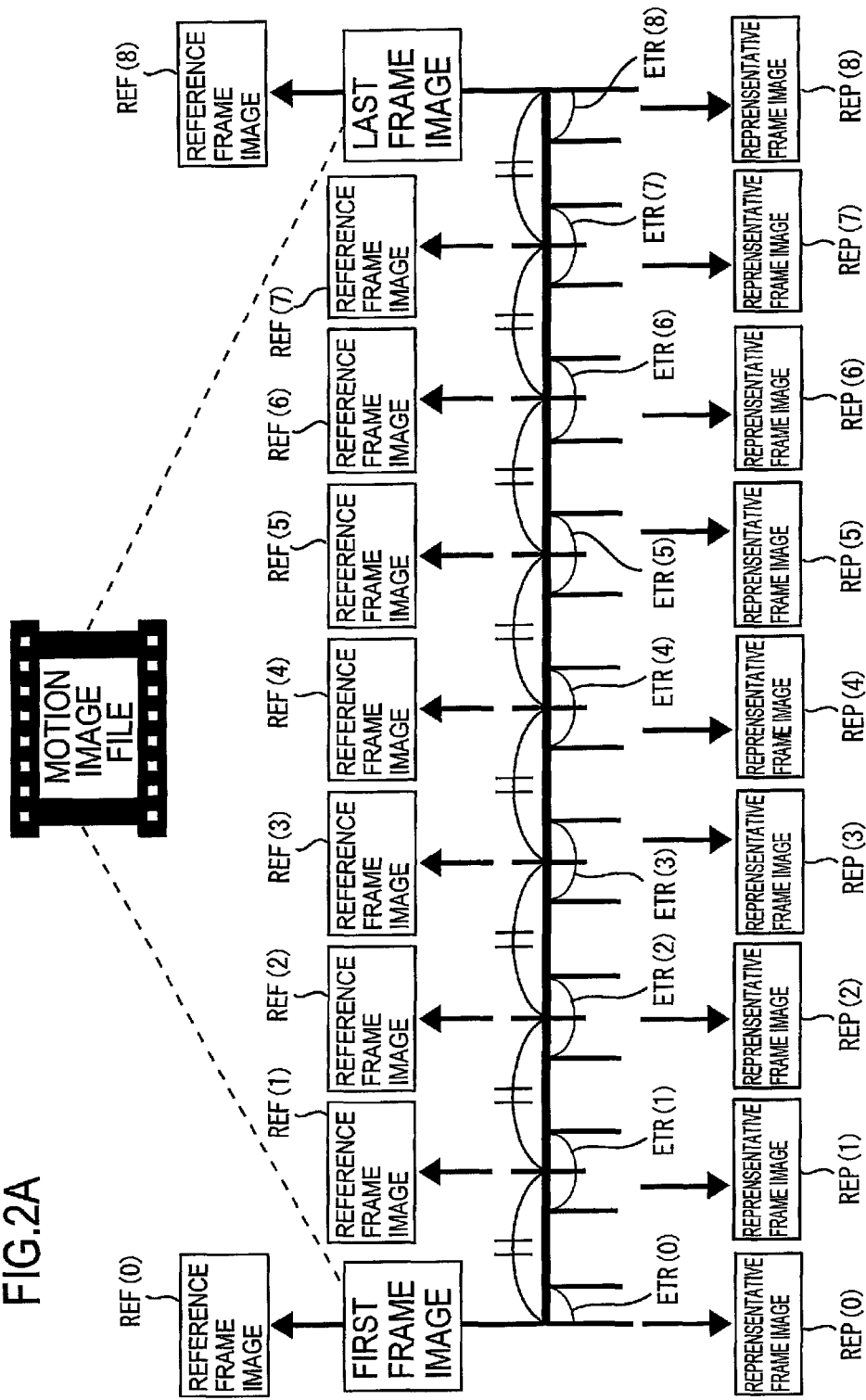
FIG. 2A is a view explaining how reference frame images are determined from a motion image file.

First, a general configuration of a multifunction device 10 (hereinafter referred to as "MFD 10") according to an embodiment of the present invention will be described with reference to FIG. 1.

The MFD 10 is provided with various functions, including a printer function, a scanner function, and a color copier function. As shown in FIG. 1, the MFD 10 is provided with a CPU 11, a ROM 12, an internal memory (RAM) 13, a scanning unit 14, a printing unit 15, an LCD unit 16, an input unit 17 and a media card slot 18 that are interconnected with one another by signal lines.

The CPU 11 performs all computations for the MFD 10. The ROM 12 is prestored with programs that the CPU 11 executes in order to implement processes (shown in FIGS. 6 to 9) described later. The RAM 13 temporarily stores results of computations performed by the CPU 11, inputted data, and the like. Details of the RAM 13 will be described later.

The printing unit 15 prints image data to which a print command has been issued. The printing unit 15 can print images in color using toner or ink of four colors: cyan, magenta, yellow and black.

The LCD unit 16 displays images (including images of character strings for messages) on a compact color liquid crystal display.

The input unit 17 has various operating keys that a user can press, and inputs data based on the pressed keys. More specifically, the input unit 17 includes an Up key, a Down key, a Left key, and a Right key for moving a cursor up, down, left, and right; and an OK key for accepting a selection (all keys are not shown).

The media card slot 18 receives a media card inserted thereinto, such as an SD card and a CompactFlash card (portable, non-volatile storage media). The MFD 10 also has a direct print function for directly reading image files from a media card inserted in the media card slot 18 and printing images represented by the image files.

The image files discussed herein include both still image files representing still images, and motion image files representing motion images and configured of a plurality of frame images. When the image file to be printed is a still image file, the MFD 10 generates the still image represented by the still image file on a single page. When the image file to be printed is a motion image file, the MFD 10 extracts a prescribed number (nine in the present embodiment) of frame images from the plurality of frame images constituting the motion image represented by the motion image file, and generates and prints an image having the extracted frame images laid out on a single page in an chronological order (to be referred to as a "layout image"; see FIG. 5A).

More specifically, as shown in FIG. 2A, the MFD 10 of the present embodiment first identifies nine frame images, including the first image (the first frame), the last image (the last frame), and seven images (seven frames) distributed equally therebetween, by dividing the total number of frames in the motion image file in eight equal intervals. The seven images may be obtained by dividing the total number of frames into eight approximately equal intervals if the total number of frames cannot be divided into exactly the same amounts of eight divisions. The extracted nine frame images are referred to as reference frame images REF(0)-REF(8) (serving as reference points). In other words, nine frame images that are positioned chronologically at a substantially equi-interval in a motion image file are selected as the reference frame images REF(0)-REF(8) in the present embodiment.

The MFD 10 further specifies, for each of the nine reference frame images REF(0)-REF(8) a range of frame images called "extraction target ranges ETR(0)-ETR(8)." Each extraction target range ETR(N) (where N=0-8) includes: a corresponding reference frame image REF(N); and a plurality of successive frame images that are chronologically continuous with the corresponding reference frame image REF(N) (to be referred to as "neighboring frame images"). The extraction target ranges are determined such that any two adjacent extraction target ranges ETR(N-1) and ETR(N) do not share any frame image in common with each other. In other words, any two adjacent extraction target ranges do not overlap with each other. Note that, as for the first extraction target range ETR(0), only those frame images that are positioned chronologically after the reference frame image REF(0) and that are continuous with the reference frame image REF(0) are selected as the neighboring frame images; as for the last extraction target range ETR(8), only those frame images that are positioned chronologically before the reference frame image REF(8) and that are continuous with the reference frame image REF(8) are selected as the neighboring frame images; and as for the remaining extraction target ranges ETR(1)-ETR(7), both of those frame images that are positioned chronologically before the respective reference frame images REF(1)-REF(7) and continuous with the reference frame images REF(1)-REF(7) and those frame images that are positioned chronologically after the respective reference frame images REF(1)-REF(7) and continuous with the reference frame images REF(1)-REF(7) are selected as the neighboring frame images.

Figure 2B:
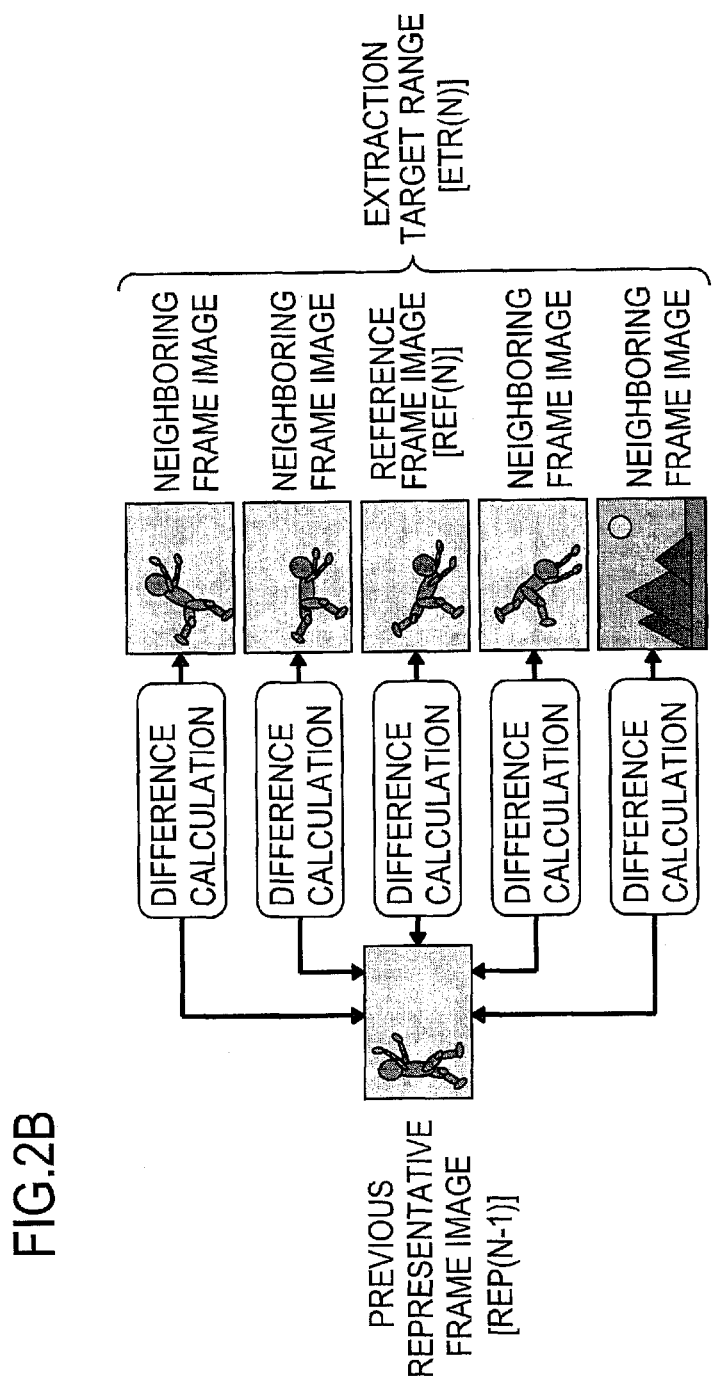
FIG. 2B is a view explaining how a representative frame image is selected in an extraction target range.
Figure 5A:
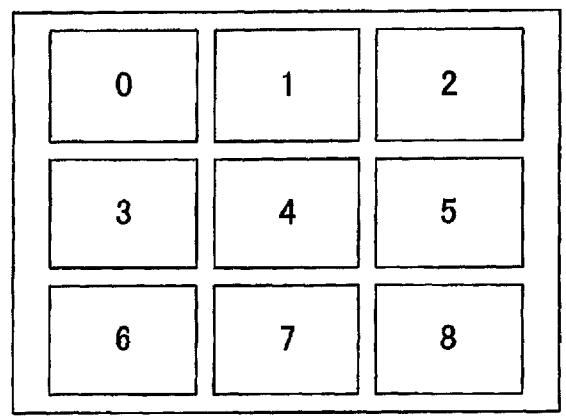
FIG. 5A is a view conceptually illustrating a layout image in which a plurality of frame images is laid out.

From each extraction target range ETR(N) (where N=0-8), a single frame image is selected as a representative frame image REP(N) (where N=0-8), which is then actually laid out in a layout image (see FIG. 5A). More specifically, as shown in FIG. 2B, the MFD 10 calculates, for each extraction target range ETR(N) except for the first extraction target range ETR(0), a difference from the representative frame image REP(N-1) that has already been selected from an extraction target range ETR(N-1) which is positioned chronologically immediately before the extraction target range ETR(N) currently being processed. A frame image whose difference is the largest among all the frame images existing in the extraction target range ETR(N) is determined as a representative frame image REP(N) of the subject extraction target range ETR(N). In other words, as the representative frame image REP(N) of an extreaction target range ETR(N) (where N=1-8), the MFD 10 selects one frame image which has the largest difference from the representative frame image selected from the extraction target range ETR(N-1) among all the frame images in the extraction target range ETR(N). For the first extraction target range ETR(0) since there is no representative frame image REP(N-1) to be compared with, the first reference frame image REF(0) in the extraction target range ETR(0) (i.e., the first frame image) is determined as the representative frame image REP(0).

The MFD 10 displays a preview screen (not shown) on the LCD unit 16, enabling the user to select an image file to be printed from among the plurality of image files stored on the media card, and prints an image represented by the selected image file.

Next, storage areas of the RAM 13 will be described with reference to FIGS. 1 and 3A through 5B.

As shown in FIG. 1, the RAM 13 is provided with various storage areas for storing different types of data. The storage areas include an input image information storage area 31, a motion image information storage area 32, a reference frame image information storage area 33, a representative frame image information storage area 34, a frame difference information storage area 35, an output image data storage area 36, a preview image data storage area 37, a frame image data storage area 38, a print data storage area 39 and a temporary variable storage area 40.

The input image information storage area 31 serves to store information on image files stored on a media card inserted in the media cart slot 18. More specifically, as shown in FIG. 3A, the input image information storage area 31 is divided into an input image ID storage area 51, an input image filename storage area 52, and an input image file size storage area 53.

The input image ID storage area 51 serves to store IDs for image files stored on the media card. The IDs are assigned sequentially beginning from 0 based on the number of image files stored on the media card (hereinafter referred to as "input image IDs"). The input image IDs are assigned to the image files that have been read from the media card in such an order that the files have been read from the media card.

The input image filename storage area 52 serves to store filenames of the image files. Specifically, the input image filename storage area 52 is a 256-byte region, with each byte's worth of region being capable of storing data for one character or data for no character. The input image file size storage area 53 serves to store numerical values (values in units of kilobytes in this example) indicating the file sizes of the image files.

The motion image information storage area 32 serves to temporarily store information read from the media card for a motion image file being processed. Specifically, as shown in FIG. 3B, the motion image information storage area 32 is provided with a format type storage area 61, a codec type storage area 62, a horizontal size storage area 63, a vertical size storage area 64 and a total frame number storage area 65.

The format type storage area 61 stores data of a type of file format for the motion image file being processed. In the present embodiment, the format type storage area 61 may store one of the values 0, 1 and 2 that have been preassigned to one of three file formats: 0 for AVI format, 1 for MOV format and 2 for MPEG format.

The codec type storage area 62 stores data of a type of codec for the motion image file being processed. In the present embodiment, the codec type storage area 62 may store one of the values 0, 1 and 2 that have been preassigned to one of three types of codecs: 0 for MotionJPEG codec, 1 for MPEG1 codec and 2 for DivX codec.

The horizontal size storage area 63 stores numerical data indicating a number of pixels in a horizontal direction in each frame image constituting the motion image file (frame image) being processed.

The vertical size storage area 64 stores numerical data indicating a number of pixels in a vertical direction in each frame image constituting the motion image file (frame image) being processed.

The total frame number storage area 65 stores numerical data indicating a total number of frame images (number of frames) constituting the motion image file being processed.

The reference frame image information storage area 33 serves to store information on the reference frame images REF(0)-REF(8) Specifically, as shown in FIG. 4A, the reference frame image information storage area 33 is provided with a reference frame information control no. storage area 71, a reference frame no. storage area 72, an ETR starting frame no. storage area 73 and an ETR ending frame no. storage area 74.

The reference frame information control no. storage area 71 prestores one of the numbers 0 through 8 for controlling information on each of the nine reference frame images REF(0)-REF(8)(control no. (N), where N=0-8).

The reference frame no. storage area 72 serves to store numerical data indicative of where each reference frame image REF(N) is located within the motion image file, that is, frame no. of each, reference frame image REF(N), where N=0-8. The first frame of the motion image file is assigned with the frame no. of 0.

The ETR starting frame no. storage area 73 serves to store, for each control no. (N) (i.e., for each extraction target range ETR(N)), a frame no. that is the smallest among frame nos. of frame images existing in the extraction target range ETR(N) (to be referred to as "ETR starting frame no.").

The ETR ending frame no. storage area 74 serves to store, for each control no. (N) (i.e., for each extraction target range ETR(N)), a frame no. that is the largest among frame nos. of frame images existing in the extraction target range (to be referred to as "ETR ending frame no.").

The representative frame image information storage area 34 serves to store information on all the nine representative frame images REP(0)-REP(8). Specifically, as shown in FIG. 4B, the representative frame image information storage area 34 is provided with a representative frame information control ID storage area 81 and a representative frame no. storage area 82.

The representative frame information control ID storage area 81 prestores one of the numbers 0 through 8 for controlling information on each of the nine representative frame images REP(0)-REP(8) (control no. (N)). These numbers (control nos. (N) of 0-8) respectively correspond to numbers (0)-(8) preassinged to respective layout positions in the layout image shown in FIG. 5A.

The representative frame no. storage area 82 stores numerical data identifying where the representative frame images REP(0)-REP(8) are positioned within the motion image file (i.e., frame nos. of the representative frame images REP(0)-REP(8)).

Figure 5B:
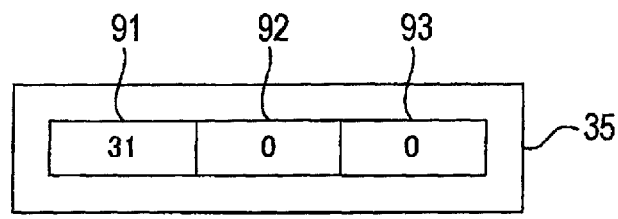
FIG. 5B is a view conceptually illustrating a frame difference information storage area of the RAM.

The frame difference information storage area 35 serves to store a difference between a frame image in an extraction target range ETR(N) ($N^{th}$ extraction target range) and a representative frame image REP(N−1) that has already been selected from an extraction target range ETR(N−1) (($N-1)^{th}$ extraction target range or "previous extraction target range ETR(N−1)" that is positioned chronologically adjacent to and prior to the extraction target range ETR(N)). More specifically, as shown in FIG. 5B, the frame difference information storage area 35 is provided with a possible ETR frame number storage area 91, a frame difference storage area 92 and a corresponding frame no. storage area 93.

The possible ETR frame number storage area 91 serves to store numeral data indicating how many frame images will possibly be included in one extraction target range ETR(N) being processed (to be referred to as "possible ETR frame number"). As will be described later, how many frame images are indeed included in the extraction target range will be determined based on this possible ETR frame number, but may or may not be equal to the possible ETR frame number.

The frame difference storage area 92 serves to temporarily store a sum of differences in an absolute value between a frame image in the extraction target range ETR(N) and the representative frame image REP(N−1) selected from the previous extraction target range ETR(N−1) (to be referred to as "previous representative frame image REP(N−1)").

The corresponding frame no. storage area 93 serves to temporarily store numerical data indicating where a frame image, whose difference from the previous representative frame image REP(N−1) is stored in the frame difference storage area 92, is positioned within the motion image file (frame no.).

The output image data storage area 36 serves to temporarily store output image data (decoded image data representing a print image). For a motion image file, the output image is a layout image in which nine representative frame images REP(0)-REP(8) extracted from the motion image file are sequentially laid out at corresponding layout positions on a single page (see FIG. 5A). For a still image file, the output image is one still image, which is represented by the still image file, laid out on a single page.

The preview image data storage area 37 serves to temporarily store a preview image generated by converting (enlarging or reducing) the output image data stored in the output image data storage area 36 into a predetermined preview image size.

The frame image data storage, area 38 serves to temporarily store frame image data extracted from a motion image file being processed. Depending on the type of the motion image file, the frame image data is stored in a compressed state and in a format peculiar to the motion image file (JPEG format or MPEG format, for example).

The print data storage area 39 serves to temporarily store: intermediate process data on which a printing process is executed to generate print data (rasterized data); and the generated print data (rasterized data).

The temporary variable storage area 40 serves to temporarily store counters, such as a preview ID counter, a representative frame counter, a reference frame counter, a difference frame counter and a difference counter. These counters are used during various processes executed by the CPU 11, as will be described later.

Next, processes according to the present embodiment executed by the CPU 11 of the MFD 10 will be described in detail with reference to FIGS. 6 through 9.

Figure 6:
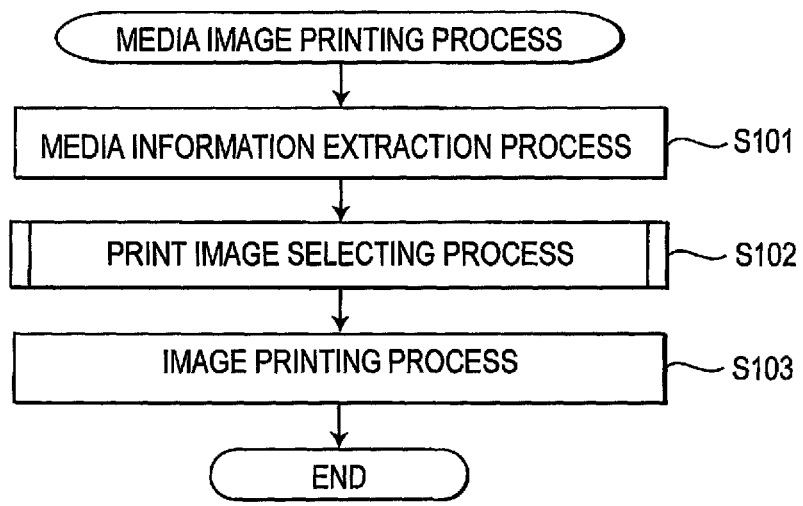
FIG. 6 is a flowchart of a media image printing process executed by the CPU of the multifunction device.
Figure 8:
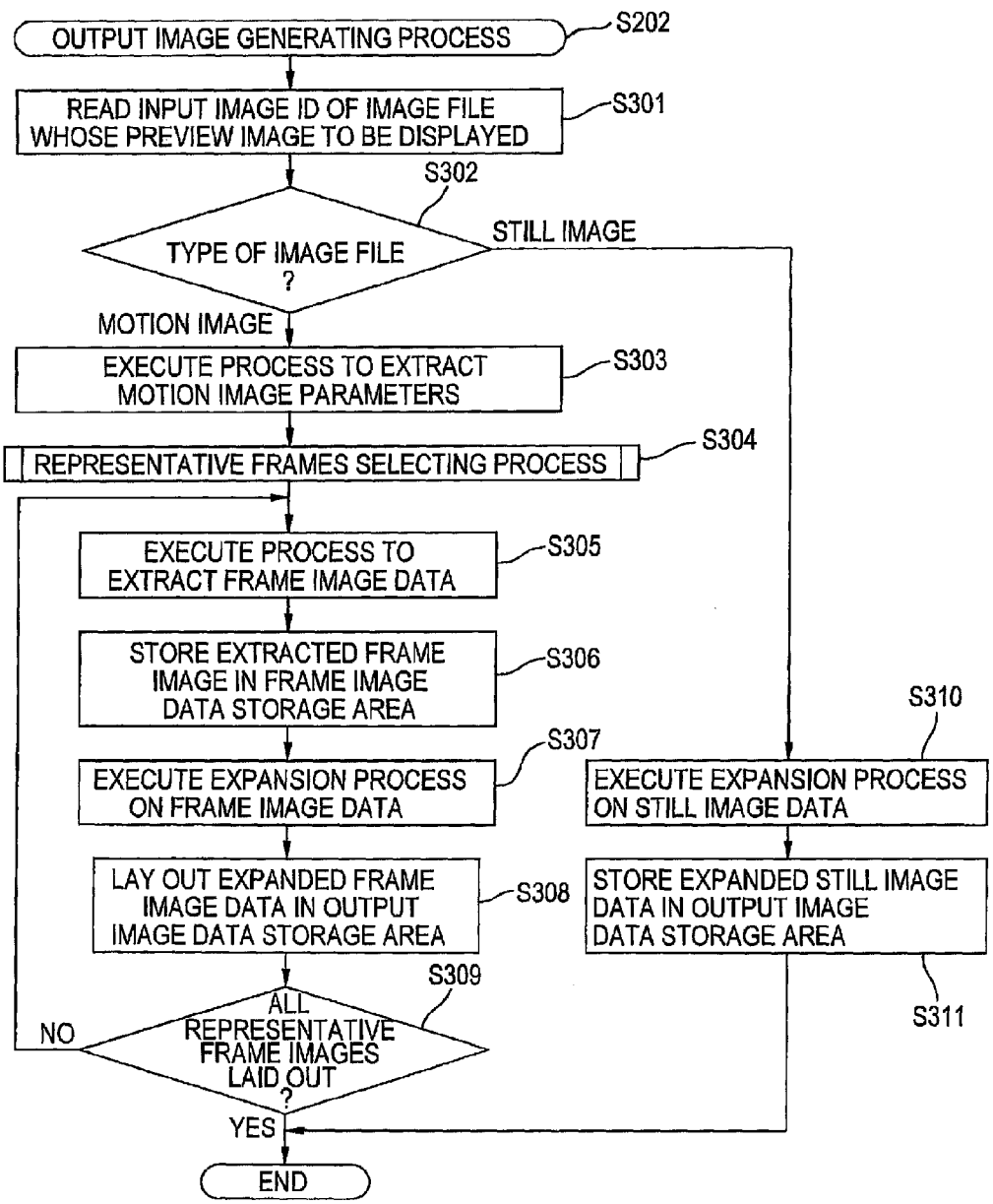
FIG. 8 is a flowchart of an output image generation process executed during the print image selection process of FIG. 7.
Figure 9:
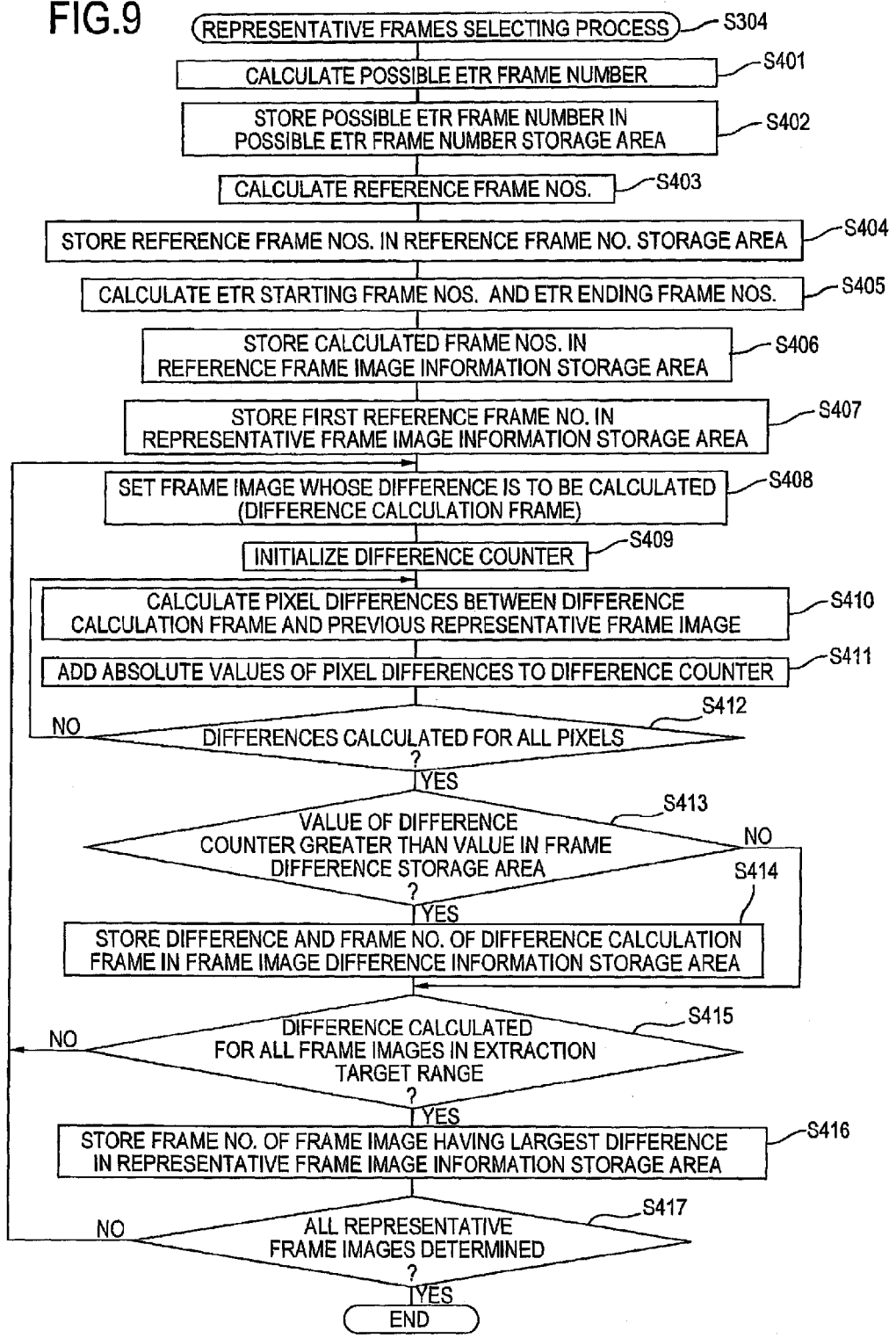
FIG. 9 is a flowchart of a representative frames selection process executed during the output image generation process of FIG. 8.

The CPU 11 of the MFP 10 performs a media image printing process shown in FIG. 6. The media image printing process includes a print image selecting process (FIG. 7) during which an output image generating process (FIG. 8) is executed. The output image generating process further includes a representative frames selecting process (FIG. 9).

The CPU 11 executes the media image printing process of FIG. 6 when the user performs an operation on the input unit 17 to select a 'media image printing mode' while a media card storing image files is inserted in the media card slot 18.

The media image printing process executed by the CPU 11 will be described while referring to a flowchart of FIG. 6.

In S101 at the beginning of this media image printing process, the CPU 11 executes a media information extraction process. Specifically, the CPU 11 reads information (a filename and a file size) for each image file stored in the media card, and stores the read information, sequentially in association with an input image ID indicative of the order that the image file has been read, in the input image filename storage area 52 and the input image file size storage area 53 of the input image information storage area 31. The input image IDs beginning from 0 are respectively stored in the input image ID storage area 51.

In S102 the CPU 11 executes the print image selecting process. During the print image selecting process, the CPU 11 displays at least one preview image on the LCD unit 16 to enable the user to capture how the image files stored on the media card will look like when actually printed, and prompts the user to select which image file should be actually printed.

The print image selecting process of S102 will be described with reference to a flowchart in FIG. 7.

In S201 at the beginning of the print image selecting process, the CPU 11 determines one image file to be displayed on the LCD unit 16 from among the image files stored in the media card. More specifically, the preview ID counter pre-stored in the temporary variable storage area 40 is given an initial value of 0. The CPU 11 determines the image file, whose input image ID (stored in the input image ID storage area 51) corresponds to the value of the preview ID counter, as a target image file whose preview image is to be displayed on the LCD unit 16. The preview image shown on the LCD unit 16 can be switched to another preview image of another image file in accordance with the user's operations of the Up, Down, Left and Right keys on the input unit 17, and one image file whose preview image is being displayed when the OK key is pressed is determined as a target image file to be printed.

In S202 the CPU 11 executes the output image generating process. During the output image generating process, the CPU 11 generates output image data (decoded print image data) for the image file determined in S201, and stores the output image data in the output image data storage area 36. The output image data is indicative of a layout image data shown in FIG. 5A if the selected image file is a motion image file. Whereas, if the selected image file is a still image file, the output image data is a still image represented by the still image file on a single page.

The output image generating process of S202 will be described with reference to a flowchart in FIG. 8.

In S301 at the beginning of the output image generating process, the CPU 11 reads (retrieves) the input image ID of the target image file whose preview image should be displayed on the LCD unit 16. More specifically, the CPU 11 refers to an input image ID that is equal to the current value of the preview ID counter and reads out the input image ID.

In S302 the CPU 11 then determines whether the type of the target image file determined in S301 is classified as a still image file or a motion image file by referencing header data in the target image file. Specifically, the CPU 11 refers to the filename stored in the input image filename storage area 52 in association with the input image ID of the target image file in the input image information storage area 31. By using the filename, the CPU 11 directly accesses the target image file stored on the media card and refers to the header data therein.

If the CPU 11 determines in S302 that the image file is a motion image file, in S303 the CPU 11 executes a process to extract motion image parameters from the motion image file. In this process, the CPU 11 acquires format type data, codec type data, horizontal size data, vertical size data and total frame number data for the motion image file. The CPU 11 stores these data respectively in the format type storage area 61, codec type storage area 62, horizontal size storage area 63, vertical size storage area 64 and the total frame number storage area 65 of the motion image information storage area 32 (see FIG. 3B). If data for a different motion image file has already been stored in the motion image information storage area 32 at this time, the CPU 11 first deletes the existing data before storing the data for the motion image file currently being processed (overwrites the existing data).

In S304 the CPU 11 executes the representative frames selecting process. During the representative frames selecting process, the CPU 11 selects nine representative frame images REP(0)-REP(8) from among the frame images in the motion image file. The nine representative frame images REP(0)-REP(8) are assigned with control nos. (N) beginning from 0 to 8, and the frame nos. of the respective representative frame images REP(0)-REP(8) are stored in the representative frame no. storage area 82 of the representative frame image information storage area 34 in association with the control nos. (see FIG. 4B). Details of the extracted frame selecting process will be described later with reference to FIG. 9.

The CPU 11 executes (repeats) processing of S305-S309 sequentially to layout the nine representative frame images REP(0)-REP(8) selected in S304 onto a layout image.

Specifically, before the loop of S305-S309 is executed for the first time, the representative frame counter prestored in the temporary variable storage area 40 is given an initial value of 0. The CPU 11 executes the processing of S305-S309 sequentially on the representative frame image REP(N) whose control no. (N) is in coincidence with the current value (N) of the representative frame counter. Once the processing of S309 ends (S309: NO), the CPU 11 increments the value of the representative frame counter by one (1) to (N+1) and returns to S305 to execute the processing of S305-S309 on the next one of the remaining representative frame images REP(N+1).

More specifically, in S305 the CPU 11 executes a process to extract, from the motion image file, frame image data whose frame no. is the same as the frame no. of the representative frame image stored in the representative frame no. storage area 82. That is, the CPU 11 extracts frame image data for the representative frame image REP(N) whose control no. (N) is equal to the current value (N) of the representative frame counter.

In S306 the CPU 11 stores the frame image data extracted in S305 (in a compressed state) in the frame image data storage area 38.

In S307 the CPU 11 performs an expansion (decoding) process on the frame image data stored in the frame image data storage area 38 and converts the frame image data into a format in which pixel calculations are possible (such as image data expressing RGB values for each pixel as numerical values from 0 to 255).

In S308 the CPU 11 lays out and stores the decoded frame image data in the output image data storage area 36 at a layout position whose layout position no. corresponds to the current value (N) of the representative frame counter.

In S309 the CPU 11 determines whether all the nine representative frame images REP(0)-REP(8) (having control nos. of 0-8) have been laid out in the output image data storage area 36. Specifically, the CPU 11 determines that all the representative frame images have been laid out in the output image data storage area 36 when the value of the representative frame counter reaches 8.

When determining that there still remains a representative frame image to be laid out in the output image data storage area 36 (S309: NO), the CPU 11 increments the representative frame counter by one (1) and returns to S305 for performing the processing of S305-S309 on data for the next representative frame image.

When all the data of the representative frame images is determined to have been laid out in the output image data storage area 36 (S309: YES), the CPU 11 ends the output image generating process. At this time, the image data stored in the output image data storage area 36 (i.e., layout image) is the output image data for the motion image file.

On the other hand, if the CPU 11 determines in S302 that the target image file is a still image file, in S310 the CPU 11 performs an expansion (decoding) process on the still image file to convert the image data in the still image file to a format in which pixel calculations are possible.

In S311 the CPU 11 stores the image data expanded in S310 in the output image data storage area 36, and subsequently ends the current output image generating process. In other words, for a still image file, unlike a motion image file, a single still image is laid out in the output image data storage area 36. At this time, the image data stored in the output image data storage area 36 (pixel data representing a still image) is the output image data for the still image file.

Figure 7:
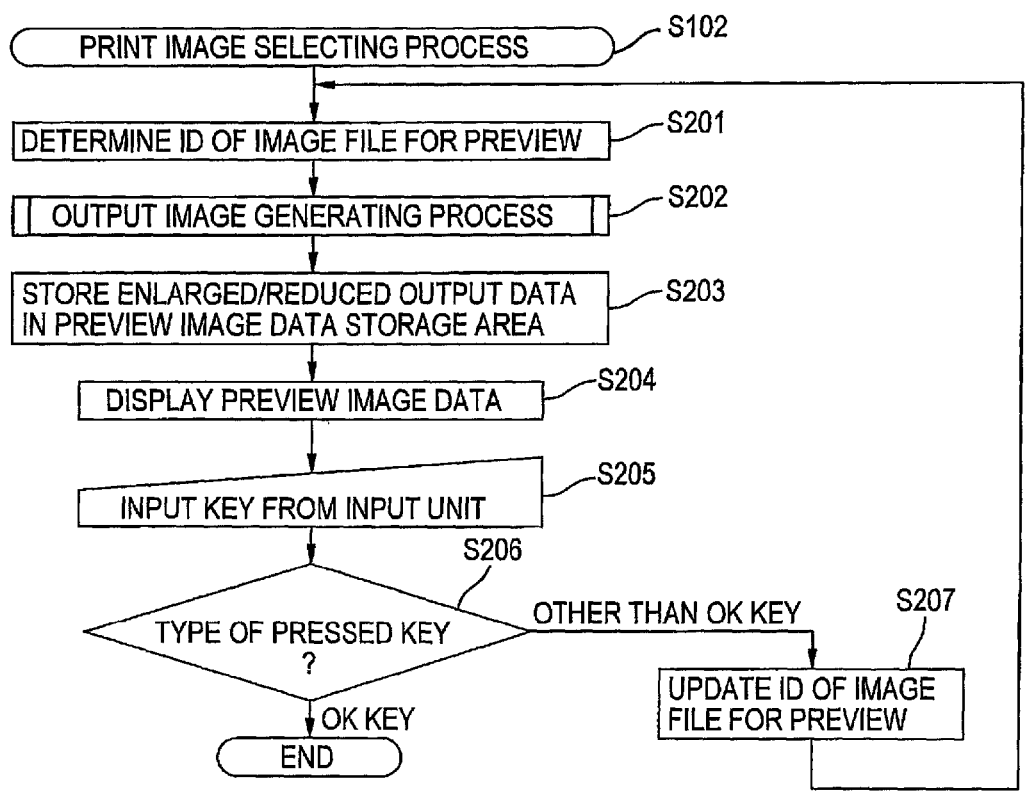
FIG. 7 is a flowchart of a print image selection process executed during the media image printing process of FIG. 6.

Upon completion of the output image generating process, the CPU 11 proceeds to S203 of the print image selecting process (FIG. 7).

In S203 the CPU 11 enlarges or reduces the output image data into a predetermined size of the preview image (a fixed size of 160×120 pixels in the present embodiment) using the well-known nearest-neighbor method, and stores the enlarged/reduced data (preview image data) in the preview image data storage area 37.

In S204 the CPU 11 displays, on the input unit 17, an image (preview image) represented by the preview image data stored in the preview image data storage area 37.

In S205 the CPU 11 accepts input from the input unit 17 in accordance with the user's operation of the keys. In S206 the CPU 11 determines whether the pressed key is the OK key or another key, such as the Up key, Down key, Left key or Right key.

When the pressed key is a key other than the OK key, the CPU 11 proceeds to S207 where the value of the preview ID counter is updated.

More specifically, when the pressed key was the Down key or Right key, in S207 the CPU 11 increments the preview ID counter by one (1) in order to switch the preview image of the image file currently being displayed to another preview image of an image file whose input image ID is greater by one (1) than that of the image file whose preview image is currently being displayed. On the other hand, if either the Up key or Left key was pressed, in S207 the CPU 11 decrements the preview ID counter by one (1) in order to switch the preview image of the image file currently being displayed to another preview image of an image file whose input image ID is smaller by one (1) than that of the image file whose preview image is currently being displayed. In this way, the preview image currently being displayed on the LCD unit 16 is changed into another preview image representing another image file. The CPU 11 then returns to S201.

However, if the value of the preview ID counter is to exceed "the number of the image files stored on the media card −1" as a result of the above increment or decrement, the CPU 11 maintains the value of the preview ID counter without performing any calculation. At this time, the preview image shown on the LCD unit 16 does not change. Here, the CPU 11 may return to S205 instead of S201.

If the CPU 11' determines the OK key was pressed in S206, which means that the preview image currently being displayed on the LCD unit 16 is selected as the image file to be printed (print target), the CPU 11 terminates the print image selecting process of S102 and proceeds to the S103 of the media image printing process (FIG. 6).

In S103, the CPU 11 executes an image printing process to print the output image for the image file selected in S102. In the image printing process, the CPU 11 copies, line by line, the output image data that is now stored in the output image data storage area 36 to the print data storage area 39, executes color conversion (from RGB to CMYK) and binary conversion on the copied output image data, and outputs the converted output data to the printing unit 15. The printing unit 15 then performs printing based on the binary data. The CPU 11 subsequently terminates the media image printing process.

Next, the representative frames selecting process of S304 will be described with reference to a flowchart in FIG. 9. During this process, nine representative frame images are selected from among the frame images in the target motion image file to be actually laid out in the layout image of the motion image represented by the motion image file.

In S401 at the beginning of the representative frames selecting process, the CPU 11 calculates how may frame images should be included in each extraction target range ETR(N) in the target motion image file (possible ETR frame number). In the present embodiment, the possible ETR frame number is set to be equal to a sum of 1 (number of the reference frame image) and a value of FPS (Frames Per Second) for the target motion image file. The FPS indicates how many number of frame images are played back per one second in the motion image file. In other words, the possible ETR frame number is set such that the number of neighboring frame images existing in each extraction target range (i.e., the number of frame images belonging to the extraction target range ETR(N) excluding the reference frame image REF(N)) is identical to the number of frame images played back per one second (FPS).

In S402 the CPU 11 stores the possible ETR frame number (i.e., FPS+1) calculated in S401 in the possible ETR frame number storage area 91 of the frame difference information storage area 35 (see FIG. 5B in which the value of 31 is stored as the possible ETR frame number as an example).

In S403 the CPU 11 calculates frame nos. of the nine reference frame images REF(0)-REF(8) (to be referred to as "reference frame no."). In the present embodiment, the nine reference frame images REF(0)-REF(8) are selected to include: the first frame image, the last frame image and seven frame images distributed equally therebetween, the seven frame images being derived by dividing the total number of frames in the motion image file in eight equal intervals. More specifically, frame images that are positioned at every such a number of frame images in the motion image file are selected as the reference frame images REF(0)-REF(8), the number being equal to a value that is obtained by dividing "the total number of frame images −1" by "the number of frame images to be extracted −1 (9−1=8 in the present embodiment)." In case that the value obtained by dividing "the total number of frame images −1" by "the number of frame images to be extracted −1" is not an integer, an integer close to the derived value, (for example, an integer that is obtained by rounding down the derived value after the decimal point) may be set as the number for determining the reference frame images.

In S404 the CPU 11 stores the reference frame nos. calculated in S403 in the reference frame no. storage area 72 of the reference frame image information storage area 33 (FIG. 4A). Specifically, the reference frame nos. are stored sequentially in correspondence with the control nos. (N) (N=0-8) of the reference frame information control no. storage area 71 (FIG. 4A) such that the smaller reference frame nos. are stored in sub-regions of the reference frame no. storage area 72 assigned with the smaller control nos. (N).

In S405 the CPU 11 derives, for each of the nine reference frame images REF(0)-REF(8), the ETR starting frame no. (smallest frame no. in the corresponding extraction target range) and the ETR ending frame no. (greatest frame no. in the corresponding extraction target range), by executing the following procedures [1] and [2].

[1] Calculation of the ETR Starting Frame No.

First, based on the reference frame no. (N), the CPU 11 calculates how many neighboring frame images should exist chronologically prior to the reference frame image REF(N) in the extraction target range ETR(N) (to be referred to as "precedent neighboring frame number"). More specifically, the CPU 11 determines either the following value A or the following value B, whichever is smaller when truncated after the decimal point, as the precedent neighboring frame number of the extraction target range ETR(N):

(value $A$)=(possible ETR frame number−1)/2

(value $B$)=(current ($N^{th}$) reference frame no.−preceding (($N$−1)$^{th}$) reference frame no.−1)/2

The value B is a limiting value that is set in order for the extraction target range ETR(N) not to have any overlap with the preceding extraction target range ETR(N−1). In other words, although the value A (number of frame images per 0.5 second) is normally smaller than the value B, there may be a case where the value A exceeds the value B; for example, when the length of the playback time of the entire motion image represented by a motion image file is extremely short. Therefore, the smaller one of the value A and the value B is determined to be the precedent neighboring frame number so as to avoid any duplication between the preceding extraction target range ETR(N−1) and the extraction target range ETR(N). This rule also applies to "a subsequent neighboring frame number" which is described next.

Then the CPU 11 calculates the ETR starting frame no. by subtracting the precedent neighboring frame number from the reference frame no. (i.e., ETR starting frame no.=reference frame no.−precedent neighboring frame number).

[2] Calculation of the ETR Ending Frame No.

First, based on the reference frame no. (N), the CPU 11 calculates how many neighboring frame images should exist chronologically after the reference frame image REF(N) in the extraction target range ETR(N) (referred to as "subsequent neighboring frame number"). Specifically, either the following value C or the following value D, whichever is smaller when truncated after the decimal point, is determined as the subsequent neighboring frame number of the extraction target range ETR(N):

(value $C$)=(possible ETR frame number−1)/2

(value $D$)=(next (($N$+1)$^{th}$) reference frame no.−current ($N^{th}$) reference frame no.−1)/2

Similar to the value B, the value D is a limiting value that is set in order for the extraction target range ETR(N) not to have any overlap with the next extraction target range ETR(N+1).

The CPU 11 then calculates the ETR ending frame no. by adding the subsequent neighboring frame number to the reference frame no. (i.e., ETR ending frame no.=reference frame no.+subsequent neighboring frame number).

It is noted that, for the first reference frame image REF(0) the CPU 11 only calculates the ETR ending frame no., while setting the ETR starting frame no. to be equal to the corresponding reference frame no. (frame no. of the first frame image, i.e., 0). Similarly, as to the last reference frame image REF(8) the CPU 11 only calculates the ETR starting frame no., while setting the ETR ending frame no. to be equal to the corresponding reference frame no. (frame no. of the last frame image).

In S406 the CPU 11 stores, for each of the nine reference frame images REF(0)-REF(8), the calculated ETR starting frame no. and the ETR ending frame no. in the ETR starting frame no. storage area 73 and the ETR ending frame no. storage area 74 of the reference frame image information storage area 33 respectively (See FIG. 4A).

In S407 the CPU 11 stores the first reference frame no. (frame no. of the first frame image), which is stored in the reference frame no. storage area 72 of the reference frame image information storage area 33 in correspondence with the control no. (N) of 0 in the reference frame information control no. storage area 71, in the representative frame no. storage area 82 of the representative frame image information storage area 34 in correspondence with the control no. (N) of 0 in the representative frame information control ID storage area 81. In this way, the first reference frame image REF(0) (first frame image) is set as the first representative frame image REP(0) that is selected first among all the representative frame images REP(0)-REP(8). The first representative frame image REP(0) is therefore easily determined.

Processing from S408 to S417 is then sequentially executed for the remaining reference frame images REP(1)-REP(0) that have the control nos. (N) of 1 to 8 and that are stored in the reference frame image information storage area 33.

More specifically, the reference frame counter prestored in the temporary variable storage area 40 is given an initial value of 1. The processing of S408-S417 is executed sequentially for the reference frame image REF(N) whose control no. (N) is in coincidence with the value of the reference frame counter. The value of the reference frame counter is incremented by one (1) when the CPU 11 returns to S408 from S417.

In S408 the CPU 11 determines one frame image, whose difference from a previous representative frame image REP(N−1) that was already selected from a previous extraction target range ETR(N−1) which is positioned immediately before the extraction target range ETR(N) currently being processed, is to be calculated (to be referred to as "difference calculation frame"). The previous representative frame image REP(N−1) has the control no. (N) equal to the value of "current reference frame counter (N)−1" in the representative frame image information storage area 34. The difference frame counter is prestored in the temporary variable storage area 40 with an initial value of 0. The CPU 11 determines the frame no. of the difference calculation frame by adding the current value of the difference frame counter to the ETR starting frame no.

In S409 the CPU 11 initializes, to zero (0), the difference counter which is prestored in the temporary variable storage area 40.

From S410 to S412, the CPU 11 calculates a sum of differences between the difference calculation frame and the previous representative frame image REP(N−1).

More specifically, the CPU 11 performs the expansion (decoding) process on these two frame image data, and calculates absolute values of differences (difference absolute values) for all the coordinates in terms of R, G and B, and sums up the difference absolute values for all the pixels to obtain the difference in total between the two frame images. Specifically, the CPU 11 calculates a sum of the difference absolute values (in RGB pixel values) for one pixel (in S410), adds the calculated difference absolute values to the current value of the difference counter (S411), and repeats the processing S410 and S411 until the difference absolute values in terms of R, G and B are accumulated for all the pixels contained in the difference calculation frame (S412).

In S413 the CPU 11 determines whether the value of the difference counter (the difference between the previous representative frame image REP(N−1) and the difference calculation frame) is greater than the value that is currently stored in the frame difference storage area 92 of the frame image difference information storage area 35. It is noted that, when starting the representative frames selecting process, 0 is stored in the frame difference storage area 92 as an initial value.

When the CPU 11 determines that the value of the difference counter is greater than the value stored in the frame difference storage area 92 (S413: YES), in S414 the CPU 11 stores the value of the difference counter and the frame no. of the difference calculation frame respectively in the frame difference storage area 92 and the corresponding frame no. storage area 93 by overwriting the existing data, and proceeds to S415.

When the value of the difference counter is smaller than or equal to the value stored in the frame difference storage area 92 (S413: NO), the CPU 11 jumps to S415.

In S415 the CPU 11 determines whether the difference has been calculated for all the frame images contained in the extraction target range ETR(N) currently being processed. Specifically, the CPU 11 determines YES in S415 when a sum of the ETR starting frame no. and the value of the difference frame counter (i.e., the frame no. of the difference calculation frame) reaches the ETR ending frame no. When determining that there still remains any frame image whose difference from the previous representative frame image REP(N−1) has not yet been calculated (S415: NO), the CPU 11 increments the difference frame counter by one (1), and returns to S408.

When the difference has been calculated for all the frame images in the current extraction target range ETR(N) (S415: YES), in S416 the CPU 11 stores the value of the corresponding frame no. storage area 93 of the frame image difference information storage area 35 in the representative frame no. storage area 82 whose corresponding control no. (N) in the representative frame image information storage area 34 corresponds to the current value of the reference frame counter (N). That is, the frame image whose difference from the previous representative frame image REP(N−1) is the greatest among all the frame images in the current extraction target range ETR(N) is selected as the representative frame image REP(N) of the extraction target range ETR(N) currently being processed, and the frame no. of the selected frame image (frame no. of the representative frame image REP(N)) is stored in the representative frame no. storage area 82.

In S417 the CPU 11 determines, for all the reference frame images REF(1)-REF(0) having the control nos. (N) of 1-8 in the reference frame image information storage area 33, whether representative frame images REP(N) have been selected from the corresponding extraction target ranges ETR (N).

When there still remains any reference frame image for which a corresponding representative frame image REP(N) has not yet been selected from the corresponding extraction target range ETR(N) (S417: NO), the CPU 11 increments the reference frame counter by one (1) and returns to S408. At this time, the frame difference storage area 92 is also initialized to have the value of 0.

On the other hand, when representative frame images REP (1)-REP(8) have been selected for all the reference frame images REF(1)-REF(8) having control nos. (N) of 1-8 in the reference frame image information storage area 33 (S417: YES), the CPU 11 terminates the representative frames selecting process and proceeds to S305 of the output image generating process (FIG. 8) to generate an output image based on the selected nine representative frame images REP(1)-REP(8).

As described above, with respect to all the frame images constituting the motion image, the MFD 10 of the present embodiment specifies nine extraction target ranges ETR(0)-ETR(8) such that the extraction target ranges do not overlap with one another (S401-S406); selects one representative frame image REP(N) from each extraction target range REP (N) (S407-S417); and generates the layout image in which all the selected representative frame images REP(0)-REP(8) are laid out on a singe page in a chronological order (S305-S309).

More specifically, the MFD 10 identifies, as nine reference frame images REF(0)-REF(8), the first frame image, the last frame image and seven frame images equally distributed therebetween, by dividing the total number of frames in the motion image file in eight equal intervals (S401-S404); and determines the nine extraction target ranges ETR(0)-ETR(8) such that each reference frame image REF(N) is included in one of the nine extraction target ranges ETR(N) (S405, S406).

The MFD 10 first selects the first frame as the first representative frame image REP(0) from the extraction target range ETR(0) regardless of how different the first frame is from any other representative frame images REP(1)-REP(8) (S407). On the other hand, from each of the extraction target ranges ETR(1)-ETR(8) the MFD 10 selects one frame image, which has a greatest difference from the previous representative frame image REP(N−1) that has already been selected from the previous extraction target range ETR(N−1) that is positioned chronologically before the extraction target range ETR(N) (S408-S417).

With this configuration, the nine extraction target ranges ETR(0)-ETR(8) are set such that each of the reference frame images REF(0)-REF(8), which are positioned chronologically at a substantially equal interval in the motion image file, is included in each of the extraction target ranges ETR(1)-ETR(8). The representative frame images REP(0)-REP(8) to be laid out on the layout image are selected from the extraction target ranges ETR(0)-ETR(8). Therefore, the representative frame image can be selected from the entire motion image file evenly in terms of time. Further, such frame image whose difference from the previous representative frame image REP(N−1) is the largest among the frame images in each extraction target range ETR(N) is selected as the representative frame image REP(N). Therefore, the representative frame images can also be selected evenly in terms of content from the entire motion image file. As a result, the user can easily figure out how the motion image flows in time and what the content of the motion image is about when looking at the layout image.

In particular, the MFD 10 of the present embodiment determines each representative frame image REP(N) from a corresponding extraction target range ETR(N) that is configured of a plurality of frame images including one reference frame image REF(N) which is positioned chronologically almost at the center in the extraction target range ETR(N). Therefore, the representative frame images REP(N) can be selected chronologically at intervals that are nearly equal to one another.

Each reference frame image REF(N) may not be positioned chronologically exactly at the center in the corresponding extraction target range ETR(N), but may be positioned chronologically close to the center in the corresponding extraction target range ETR(N).

Further, in the MFD 10 of the present embodiment, the number of frame images included in one extraction target range ETR(N) (possible ETR frame number) increases as the motion image has a larger number of frame images to be played back per a unit of time (FPS). If the possible ETR frame number were set to be a specific fixed number, a period of time corresponding to the extraction target range ETR(N) will possibly vary for the individual motion images defined by different FPS values. In contrast, with the configuration of the present embodiment, a fixed period of time can be set for the extraction target range ETR(N) for the individual motion images even if the values of the FPS of the motion images are different from one another.

While the invention has been described in detail with reference to the embodiment thereof, it would be apparent to those skilled in the art that various changes and modifications may be made therein without departing from the spirit of the invention.

For example, the sum of the difference absolute values in pixel values for all the pixel positions is used as the difference indicating the amount of change between frame images in the present embodiment. However, any value that can reflect how much two frame images are different may be employed as the 'difference' indicating the amount of change between the two frame images.

Further, instead of the sum of the difference absolute values between pixel values in two frame images, the size of a motion vector between two frame images may be calculated by a well-known optical flow method and may be used to determine the difference between the frame images.

Further, since the first representative frame image REP(0) that is firstly selected cannot be compared with any other representative frame image, the first reference frame image REF(0) is selected as the representative frame image REP(0) (S407) in the present embodiment. However, the present invention is not limited to this configuration.

For example, the first representative frame image REP(0) may be selected from the first extraction target range ETR(0) such that a dispersion of pixel values is calculated for each frame image included in the extraction target range ETR(0) and a frame image having a dispersion of pixel values greatest among all the frame images in the extraction target range ETR(0) may be determined as the first representative frame image REP(0). The dispersion of pixel values in each frame image can be calculated, for example, from an expression (1) below.

$$Dfs = \frac{\sum_{j=0}^{2} \sum_{i=0}^{p-1} \{E(i) - i\}^2}{3 \times p} \qquad \text{expression (1)}$$

In this expression (1), Dfs represents dispersion (sample variance), p represents a total number of pixels in a frame image, i represents a pixel value and E(i) represents an average (arithmetic average) of pixel values in the frame image. j indicates a color plane (R, G, or B plane). Here, the number of pixels p is multiplied by 3 in the denominator since the difference between the average pixel value and each pixel value is calculated for each of the R, G and B planes.

In this way, as to the firstly-selected representative frame image REP(0), a frame image, whose dispersion in pixel values is greatest among the frame images included in the first extraction target range ETR(0), may be selected. This configuration facilitates preventing such frame images that are inappropriate for capturing the content of the motion image (such as too dark images or images with heavy jiggling) from being selected as the representative frame image REP(0) of the first extraction target range ETR(0).

Still alternatively, the first representative frame image REP (0) may be selected by: first calculating a histogram distribution of pixel values in each frame image existing in the first extraction target range ETR(0); and then by selecting one frame image having a range of histogram distribution greatest among all the frame images in the first extraction target range ETR(0).

Figure 10:
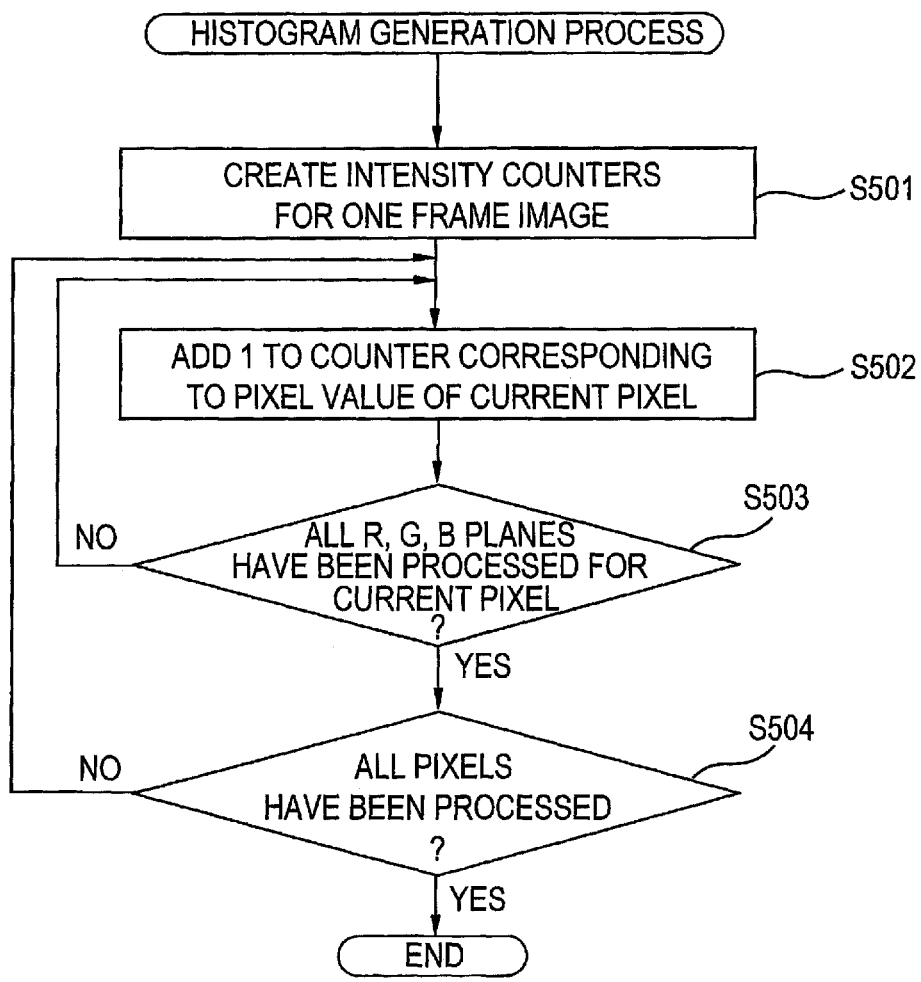
FIG. 10 is a flowchart of a histogram generation process.

Specifically, FIG. 10 shows a flowchart of a process to generate a histogram of pixel values in one frame image (histogram generation process). Upon starting the histogram generation process, in S501, the CPU 11 first creates a plurality of intensity counters, the total number of the intensity counter being equal to the total number of numerical values indicative of intensities that each pixel value will possibly possess in terms of each color plane. For example, if one frame image is expressed in eight bits per pixel per one color plane, each pixel value can possibly possess one of the numerical values of 0-255 as an intensity of the pixel value. In this case, 255 intensity counters are prepared. The 255 intensity counters are sequentially assigned with counter nos. beginning from 0 to 225. Each intensity counter is given an initial value of 0. In S502, the CPU 11 increments, by one (1), a value of one intensity counter whose counter no. corresponds to a numerical value (intensity) that a current pixel possesses. In S503, the CPU 11 determines whether intensities have been counted for the current pixel in terms of all the R, G and B planes. If there remains any color plane for which intensity of the current pixel has not yet been counted (S503: NO), the CPU 11 returns to S502. When intensities for each pixel have been counted for all of the R, G and B planes (S503: YES), the CPU 11 then determines in S504 whether intensities have been counted for all the pixels. If intensities have not yet been counted for all the pixels (S504: NO), the CPU 11 returns to S502 and repeats the processing of S502-S504. When intensities have been counted for all the pixels in the one frame image (S504: YES), the CPU 11 terminates the histogram generation process for the subject frame image. In this way, histogram information can be generated for the one frame image by incrementing the values of the intensity counters according to the pixel values in the one frame image.

Subsequently, the range of the histogram distribution of pixel values in the one frame image is calculated as follows:

(range of histogram distribution)=(largest counter no. among counter nos. of intensity counters whose values are greater than zero)−(smallest counter no. among counter nos. of intensity counters whose value are greater than zero)

The above-described process to generate the histogram distribution of the pixel values and to calculate the range of histogram distribution is executed for all the frame images existing in the first extraction target range ETR(0). Then one frame image that has the largest range of histogram distribution is selected as the representative frame image REP(0) from among all the frame images in the first extraction target range ETR(0).

With this configuration, a well-balanced frame image in terms of intensity distribution can be selected as the first representative frame image REP(0). Also, inappropriate frame images can be hardly selected as the first representative frame image REP(0), just as in the case of selection using the dispersion calculation.

Further, in the MFD 10 of the present embodiment, selection of the representative frame images REP(0)-REP(8) is executed sequentially in a chronological order from the first extraction target range ETR(0) that is positioned chronologically earliest among all the extraction target ranges ETR(0)-ETR(8) in the motion image. However, to the contrary, selection of the representative frame images REP(0)-REP(8) may be executed sequentially in a reverse chronological order from the last extraction target range ETR(0) that is positioned chronologically last among all the extraction target ranges ETR(0)-ETR(8) in the motion file. Or, selection of the representative frame images REP(0)-REP(8) may be executed first from an extraction target range ETR(N) that is positioned chronologically in the middle of the motion image. In this case, the representative frame images REP(0)-REP(8) are selected in such an order that one representative frame image REP(N) is first selected from a middle extraction target range ETR(N) that is positioned chronologically in the middle of the motion image. Then, other representative frame images are selected sequentially in such an order that an extraction target range positioned closer to the middle extraction target range ETR(N) is selected earlier than another extraction target range that is positioned further from the middle extraction target range ETR(N), and that extraction target ranges chronologically before the middle extraction target range ETR(N) and extraction target ranges positioned chronologically after the middle extraction target range ETR(N) are selected alternately with one another. More specifically, after the representative frame image REP(N) is first selected, the representative frame image REP(N−1) is selected from the extraction target range ETR(N−1) that is positioned chronologically forward of the middle extraction target range ETR(N), then selected is the representative frame image REP(N+1) from the extraction target range ETR(N+1) that is positioned chronologically backward of the middle extraction target range ETR(N), selected next is the representative frame image REP(N−2) from the extraction target range ETR(N−2) that is positioned chronologically forward of the extraction target range ETR (N−1), and subsequently selected is the representative frame image REP(N+2) from the extraction target range ETR(N+2) that is positioned chronologically backward of the extraction target range ETR(N+1), and so forth.

Further, in the present embodiment, the reference frame images REF(0)-REF(8) are selected before the extraction target ranges ETR(0)-ETR(8) are determined, and the extraction target ranges ETR(0)-ETR(8) are then set with reference to the reference frame images REF(0)-REF(8) so that each reference frame image REF(N) is located chronologically center in the corresponding extraction target range ETR(N). However, the extraction target ranges ETR(0)-ETR(8) may be determined without determining the reference frame images REF(0)-REF(8).

Further, the MFD 10 according to the above-described embodiment identifies nine representative frame images REP (0)-REP(8) from a motion image file, but the present invention is not limited to this configuration. For example, the number of representative frame images to be extracted from a motion image file may not be limited to nine but can be greater or smaller than nine, and also may not necessarily be fixed to any specific number. The user may be prompted to specify how may frame images are to be extracted.

Further, the present invention has been applied to the MFD 10 as an example of image processing devices according to the present embodiment, but the present invention may also be applied to a printing device other than a multifunction device, such as a printer without scanning function. The present invention may also be applied to a device that does not print images, for example, to an information processing device such as a personal computer.

What is claimed is:

1. An image processing device comprising:
a memory configured to store computer readable instructions; and
a processor configured to execute the instructions that cause the processor to implement a process comprising:
identifying a plurality of reference frame images from a motion image configured of a plurality of frame images that are chronologically in succession with one another, the reference frame images comprising a first frame image positioned at the beginning of the motion image, a last frame image positioned at the end of the motion image and at least one middle frame image distributed at a substantially equi-interval between the first frame image and the last frame image in the motion image;
setting a plurality of extraction target ranges in the motion image, each extraction target range being configured of a group of frame images that are selected from among the plurality of frame images constituting the motion image and that are chronologically in succession with one another, and the plurality of extraction target ranges being set such that there is no common frame image shared among the extraction target ranges and such that each reference frame image is included in each extraction target range, the middle frame images identified as the reference frame images being positioned chronologically at a substantially center of the group of frame images in the corresponding extraction target ranges;
selecting a representative frame image from among the group of frame images in each extraction target range, the representative frame image being such a frame image whose difference from another representative frame image is the largest among differences of the frame images belonging to the extraction target range from the another representative frame image, the another representative frame image being selected from one of the extraction target ranges that is positioned chronologically adjacent to the extraction target range from which the representative frame image is selected; and
generating a layout image in which the selected representative frame images are laid out in such a pattern that indicates a chronological relationship among the representative frame images.

2. The image processing device as claimed in claim 1, wherein the extraction target range from which the representative frame image is selected is positioned chronologically after the extraction target range from which the another representative frame image is selected.

3. The image processing device as claimed in claim 1, wherein the extraction target range from which the representative frame image is selected is positioned chronologically before the extraction target range from which the another representative frame image is selected.

4. The image processing device as claimed in claim 1, wherein the selecting selects a representative frame image from each extraction target range such that one representative frame image is firstly selected from one extraction target range regardless of a difference between the representative frame image and another representative frame image that is selected from an extraction target range positioned chronologically adjacent to the one extraction target range, and each remaining representative frame image other than the firstly-selected representative frame image is selected from a corresponding extraction target range based on a difference from another representative frame image that has already been selected from an extraction target range positioned chronologically adjacent to the corresponding extraction target range.

5. The image processing device as claimed in claim 4, wherein the representative frame image that is firstly selected is the reference frame image included in the one extraction target range.

6. The image processing device as claimed in claim 4, wherein the representative frame image that is firstly selected is such a frame image whose dispersion of pixel values is the largest among the frame images in the one extraction target range.

7. The image processing device as claimed in claim 4, wherein the representative frame image that is firstly selected is such a frame image whose range of histogram distribution of pixel values is the greatest among the frame images in the one extraction target range.

8. The image processing device as claimed in claim 1, wherein the setting sets each extraction target range such that a number of the frame images included in each extraction target range increases as the motion image has a greater number of frame images per unit of time.

9. The image processing device as claimed in claim 1, wherein the first frame identified as the reference frame image is positioned at the beginning of the corresponding extraction target range, and the last frame identified as the reference frame image is positioned at the end of the corresponding extraction target range.

10. A non-transitory computer readable storage medium that stores a set of program instructions installed on and executed by a processor of an image processing device, the set of program instructions, when executed by the processor, causing the processor to implement a process comprising:
identifying a plurality of reference frame images from a motion image configured of a plurality of frame images that are chronologically in succession with one another, the reference frame images comprising a first frame image positioned at the beginning of the motion image, a last frame image positioned at the end of the motion image and at least one middle frame image distributed at a substantially equi-interval between the first frame image and the last frame image in the motion image;
setting a plurality of extraction target ranges in the motion image, each extraction target range being configured of a group of frame images that are selected from among the plurality of frame images constituting the motion image and that are chronologically in succession with one another, and the plurality of extraction target ranges being set such that there is no common frame image shared among the extraction target ranges and such that each reference frame image is included in each extraction target range, the middle frame images identified as the reference frame images being positioned chronologically at a substantially center of the group of frame images in the corresponding extraction target ranges;
selecting a representative frame image from among the group of frame images in each extraction target range, the representative frame image being such a frame image whose difference from another representative frame image is the largest among differences of the frame images belonging to the extraction target range from the another representative frame image, the another representative frame image being selected from one of the extraction target ranges that is positioned chronologically adjacent to the extraction target range from which the representative frame image is selected; and generating a layout image in which the selected representative frame images are laid out in such a pattern that indicates a chronological relationship among the representative frame images.

11. The non-transitory computer readable storage medium as claimed in claim 10, wherein a representative frame image is selected from each extraction target range such that one representative frame image is firstly selected from one extraction target range regardless of a difference between the representative frame image and another representative frame image that is selected from an extraction target range positioned chronologically adjacent to the one extraction target range, and each remaining representative frame image other than the firstly-selected representative image is selected from a corresponding extraction target range based on a difference from another representative frame image that has already been selected from an extraction target range positioned chronologically adjacent to the corresponding extraction target range.

12. The non-transitory computer readable storage medium as claimed in claim 10, wherein the first frame identified as the reference frame image is positioned at the beginning of the corresponding extraction target range, and the last frame identified as the reference frame image is positioned at the end of the corresponding extraction target range.

* * * * *